Aug. 27, 1963   H. GOLLER   3,101,512
SCREW INJECTION MOLDING MACHINE
Filed Dec. 2, 1960   4 Sheets-Sheet 1

INVENTOR
HERBERT GOLLER
BY Dicke, Craig & Freudenberg
ATTORNEYS

Aug. 27, 1963   H. GOLLER   3,101,512
SCREW INJECTION MOLDING MACHINE
Filed Dec. 2, 1960   4 Sheets-Sheet 2

INVENTOR
HERBERT GOLLER
BY Dieke, Craig & Freudenberg
ATTORNEYS

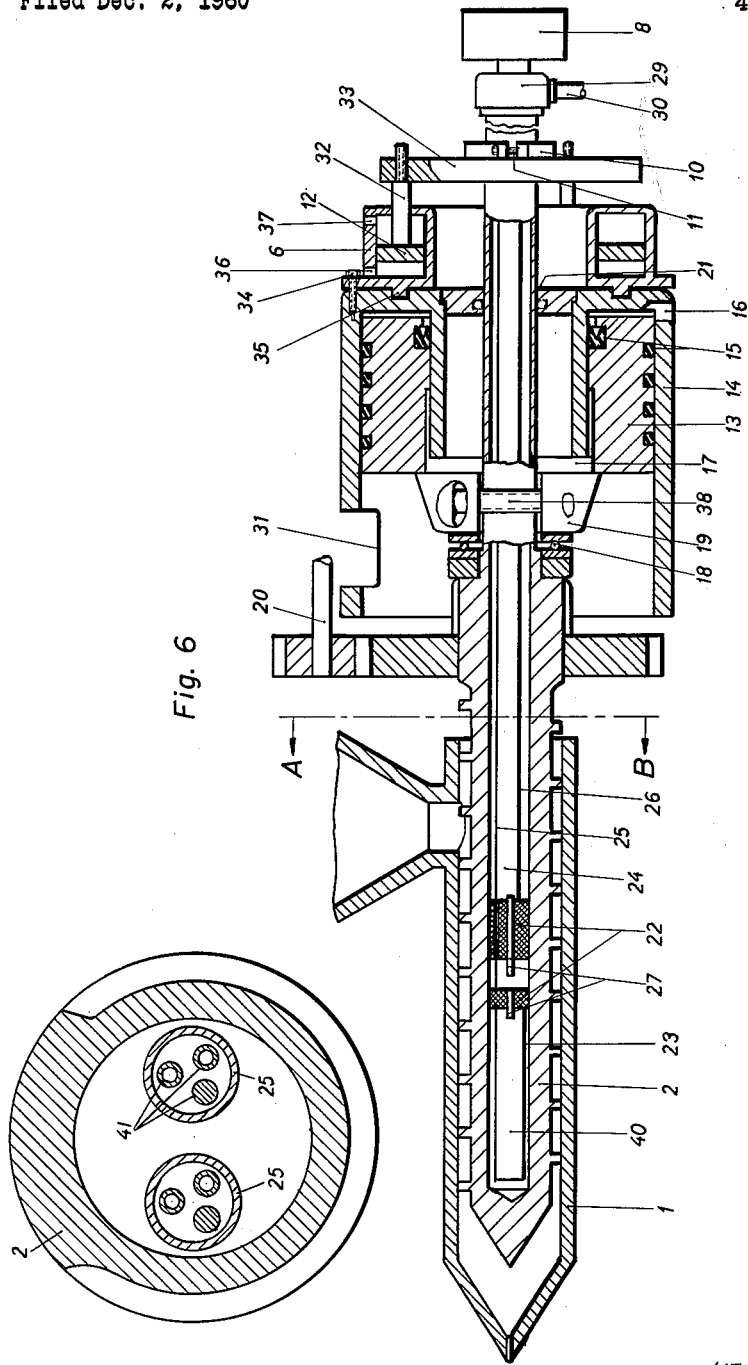

United States Patent Office 3,101,512
Patented Aug. 27, 1963

3,101,512
SCREW INJECTION MOLDING MACHINE
Herbert Goller, Nurnberg, Germany, assignor to Ankerwerk Gebruder Goller, Nurnberg, Germany
Filed Dec. 2, 1960, Ser. No. 73,364
Claims priority, application Germany Dec. 12, 1959
10 Claims. (Cl. 18—30)

The present invention relates to a screw injection molding machine of the type in which the screw is adapted to plasticize the casting resin within the delivery barrel of the machine and then to inject it into a mold by a combination of rotary and longitudinal movements.

It is an object of the present invention to provide a screw injection molding machine of the above-mentioned type in which the screw may at any desired time during the operation be selectively divided into heating or cooling zones or into both heating and cooling zones of adjustable sizes, and it is a further object of the invention to design the screw injection molding machine in a manner so as to permit the screw to be easily inserted into and removed from the barrel in the axial direction through the rear end thereof.

In the previous designs of screw injection molding machines, the screw is moved longitudinally by means of hydraulic cylinders, mechanical gears, or rods which extend coaxially with the screw and are connected to the rear end thereof or to the rear end of the drive shaft of the screw. The known manner of transmitting the injection force to the screw by means of a hydraulic cylinder and a crossbar necessarily leaves only a limited space for providing a feed line for supplying coolants to the inside of the extruder screw. By reason of its basic design, this type of screw injection molding machine can therefore not be utilized to attain the above-mentioned objects of the invention, inasmuch as it does not permit the screw to be withdrawn from the barrel toward the rear nor the temperature zones to be locally controlled and regulated from the inside of the screw.

The present invention is based upon the concept that for controlling the operation and function of the screw of a screw injection molding machine it would be of the greatest value if it were possible to control the temperature of the plastic mass from the inside of the screw. This object may be attained according to the invention by making the screw of a hollow structure and by designing the machine in such a manner that the screw is freely accessible from the rear thereof in the axial direction. According to the invention it is then possible to divide the inside of the screw selectively into heating and cooling zones of different sizes and to vary the size of the individual heating and cooling zones at any desired time during the operation of the machine.

The important advantage which is attained by the invention over the state of the prior art consists in the fact that it is now possible by means of the inventive arrangement in combination with suitable heating and cooling means at the inside of the screw to control the functions of the screw and the melting process within the delivery barrel much more accurately than was previously possible. The size of the heating or cooling chambers within the screw may be varied either in accordance with the longitudinal movements of the screw or independently thereof. If the heating or cooling zones are controlled in response to the longitudinal movements of the screw, the adjustments may be carried out by control elements which either precede, lag behind, or move simultaneously with these longitudinal movements. By this inventive arrangement and by being able to adjust the size of the heating or cooling zones, it is possible to control the temperatures within the plasticizing screw despite the longitudinal movements thereof so that the plastic material within the delivery barrel between the head of the screw and the feed hopper will at any phase of the operation of the screw be in the most desirable plasticized condition for the extrusion of the material into a mold. Any interference with the most desirable temperature and melting conditions due to the longitudinal movements of the screw may thus be avoided completely. This was not possible in the screw infection molding machines according to previous designs in which, by the return stroke of the screw, the material within the feed zone of the machine was suddenly brought into contact with the screw threads which were still too hot from the previous operation, which resulted in uncontrollable feeding difficulties as well as other disadvantages.

By making the screw of a tubular structure the present invention further permits additional substances to be supplied to the molten plastic mass within the barrel or other substances to be removed from the mass or other influences to be exerted upon the functions of the screw through the hollow inside of the screw.

The free access to the hollow inside of the screw may be attained according to the invention, for example, by mounting the gear which is required for rotating the screw so as to be movable in the longitudinal direction by means of hydraulic cylinders and pistons which are provided laterally of the gear. Two or more of these pistons may then be connected to each other by securing their piston rods to a suitable connecting member.

The free access to the inside of the screw may, however, also be attained according to the invention, for example, by providing around the rotatable screw an annular cylinder with an annular piston therein which may be acted upon by a pressure medium to move the screw in the longitudinal direction.

The free accessibility of the screw of the screw injection molding machine according to the invention has the further great advantage that the same mechanism which is required for moving the screw for its plasticizing and extruding operation may, by the addition of a very simple device, also be utilized for withdrawing the screw toward the rear from the delivery barrel and to reinsert it into the rear end of the barrel in the axial direction. Since in previous screw injection molding machines it was only possible to remove the screw from the barrel after the entire delivery barrel together with all connections for the heating and cooling system was disassembled, it is clearly evident that the new manner of construction and of assembling of the screw injection molding machine according to the invention requires considerably less effort and is considerably less expensive, and that the assembly and disassembly of the entire machine and particularly the removal and reinsertion of the screw may be carried out within a fraction of the time which was previously required.

The objects, features, and advantages of the present invention will become further apparent from the following description thereof which is to be read with reference to the accompanying drawings of three preferred embodiments of the invention which, however, are to be regarded merely as examples of the numerous forms of construction in which the inventive concept may be applied, and in which—

FIGURE 6 shows a view similar to FIGURE 5, but entirely in section and with the plasticizing screw in a different position in its operation; while FIGURE 7 shows an enlarged cross section taken along line A—B of FIGURE 6.

Figure 2:
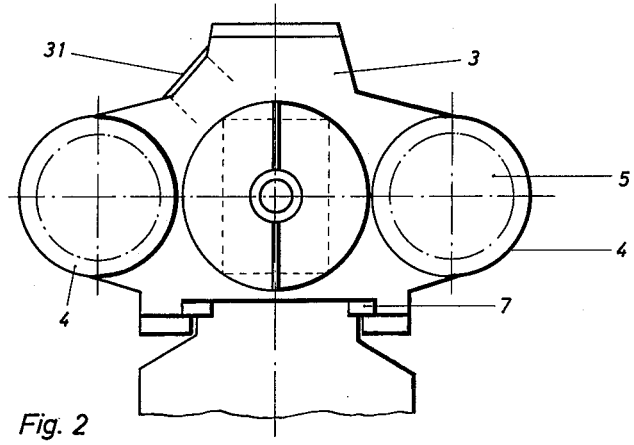
FIGURE 2 shows a rear view of the apparatus as seen from the bottom of FIGURE 1.

Referring to the drawings, the delivery barrel 1 contains a hollow screw 2 which is adapted to be rotated therein and to be moved in its axial direction. A housing 3 at the rear of barrel 1 contains the driving gear for effecting the rotary movement of screw 2. In the embodiment of the invention, as shown in FIGURES 1 to 4, a pair of cylinders 4 are provided in housing 3 at both sides of the driving gear. Cylinders 4 contain stationary pistons 5 and, when the pistons are acted upon by a pressure fluid, cylinders 4 are slidable with housing 3 along pistons 5 so as to produce the longitudinal movements of screw 2 through a radially removable ring 19 and an axial thrust bearing 18.

Figure 1:
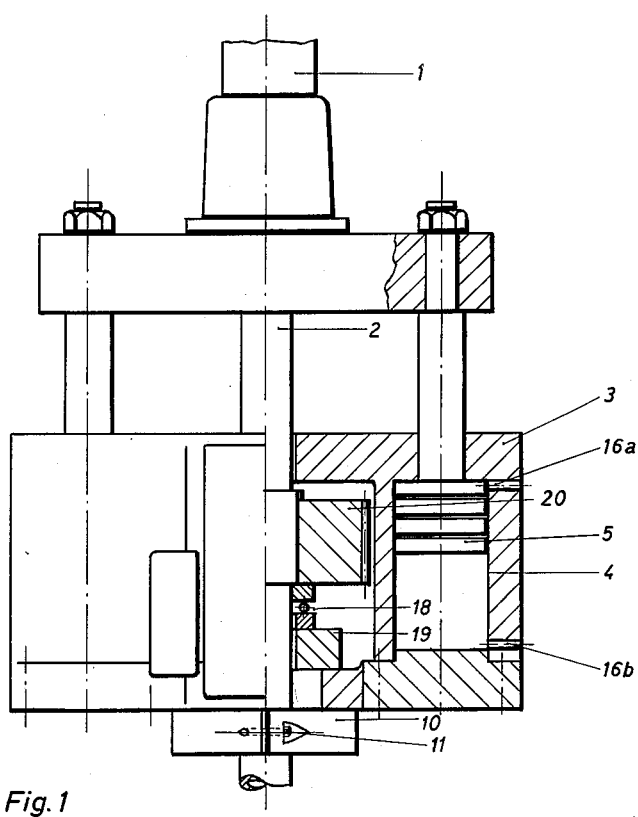
FIGURE 1 shows a plan view, partly in section, of a drive mechanism for effecting the longitudinal movement of the screw of a screw injection molding machine according to the invention.
Figure 3:
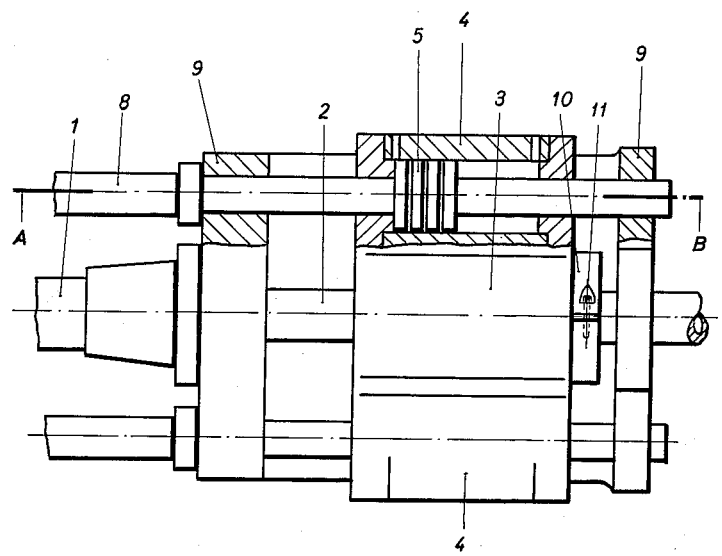
FIGURE 3 shows a plan view, partly in section, of a modification of the drive mechanism.
Figure 4:
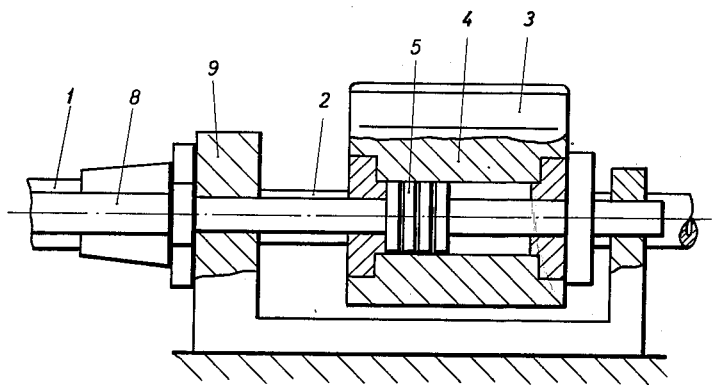
FIGURE 4 shows a side view of the apparatus according to FIGURE 3, partly in a cross section taken along line A—B of FIGURE 3.

The two embodiments of the invention as shown in FIGURES 1 and 2, and in FIGURES 3 and 4, respectively, differ from each other primarily by the fact that the drive unit contained in housing 3 according to FIGURES 1 and 2 is slidable on a bed 7, while according to FIGURES 3 and 4 it is slidable along guide bars 8 which are mounted in crossbars 9.

The hydraulic cylinders and pistons may be provided not only laterally of the gear, as illustrated in FIGURES 1 to 4, but also below or above the gear.

Figure 5:
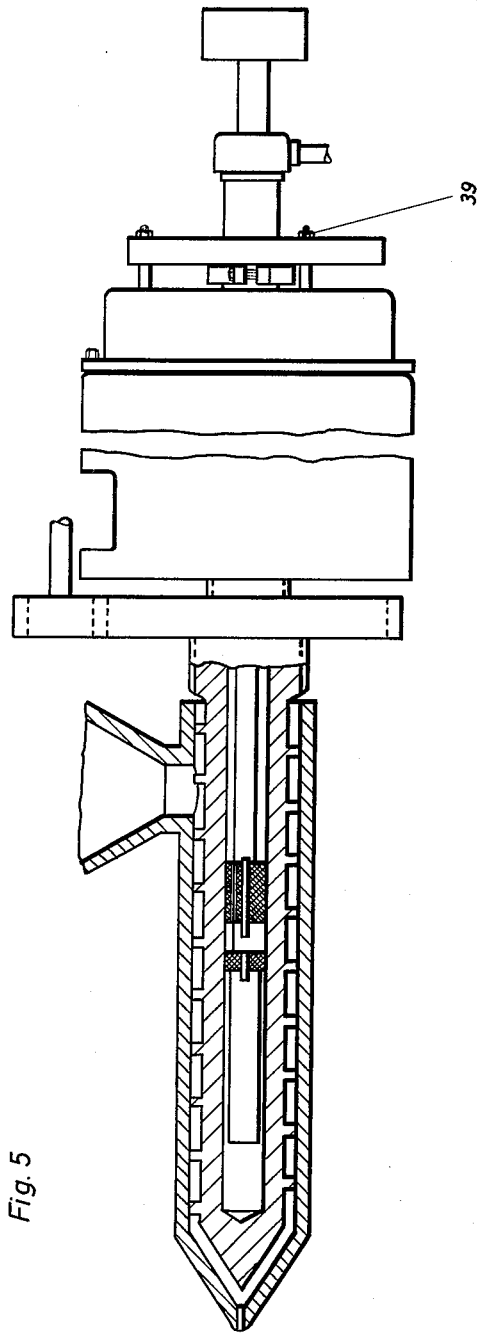
FIGURE 5 shows a side view, partly in cross section, of a further embodiment of the invention.

FIGURES 5 and 6 illustrate a further embodiment of the invention in which the hydraulic piston is designed in the form of an annular piston 13 which is provided with piston rings and a packing sleeve 15 for sealing the piston relative to cylinder 14. Oil under pressure may be passed into cylinder 14 at 16 so as to act upon the annular piston 13. Only a small amount of oil will leak into a chamber 17 from which it will flow back to the oil container without pressure through a return line, not shown. The intermediate two-piece ring 19 and an axial thrust bearing 18 transmit the force of piston 13 to screw 2 which is rotated by gear 20. Screw 2 extends through piston 13 and through the bore in the bearing cover 21, in which it is sealed against the low pressure of the leakage oil, to the outside of the cylinder housing 14. Screw 2 is in this manner freely accessible from the rear in the axial direction.

Screw 2 is of a hollow tubular structure and is divided into heating zones 23 and cooling zones 24 by partitions 22 which insulate the two zones from each other to prevent any heat exchange, and which are mounted in a stationary position within screw 2 by means of supporting pipes 25 and 26. By varying the diameter of pipes 25 and 26, it is possible to vary the size of the heating and cooling zones 23 and 24. As shown in FIGURE 7, pipes 25 and 26 contain the feed and return lines 41 for the respective media for heating and cooling the screw. Pipes 25 and 26, may, however, also contain electric, hydraulic, or pneumatic lines so that the control elements which are provided according to the invention for controlling the functions of screw 2 may be operated either mechanically, electrically, hydraulically, or pneumatically.

In the particular embodiment of the invention as illustrated in the drawings, screw 2 is heated by means of a heating cartridge 40 in the head of the screw. The control of the heating and cooling temperatures may be carried out, for example, by thermostats 27 which are installed in the insulated partitions. In order to change the size of heating chamber 23 and cooling chamber 24, partitions 22 may be shifted in the axial direction by means of pipes 25 which terminate in a control box 28. This may be done either manually at any desired time during the operation of the machine or automatically by means of suitable means of a conventional type which are mounted in control box 28. The size of the heating and cooling chambers may be adjusted either in synchronism with or in a certain relation to the longitudinal movements of screw 2, or independently of these longitudinal movements.

At a sufficient distance from the cylinder housing 14, the rear end of the rotatable tubular screw 2 is provided with a coupling 29 of a known type for connecting the necessary feed lines 30 to pipes 25 and 26 or to screw 2.

The removal or withdrawal of the plasticizing screw 2 from the delivery barrel 1 according to the two embodiments as shown in FIGURES 1 and 2 and FIGURES 3 and 4, respectively, may be carried out in a similar manner as follows:

The two-piece ring 19 is withdrawn from screw 2 in a radial direction through the opening 31 of housing 3. By passing oil under pressure into cylinders 4 at 16a, housing 3 will be moved together with gear 20 along the then stationary screw 2 in the direction toward the barrel 1. After its bolt 11 is loosened, setting ring 10 is likewise shifted in the direction toward barrel 1 until it engages with housing 3, when it is again clamped tightly on screw 2 by bolt 11. Oil is then passed under pressure through the opening 16b into cylinder 4, whereby housing 3 will be shifted in the axial direction toward the rear and will thereby pull screw 2 out of barrel 1 through setting ring 10 for a distance which is equal to the movement of housing 3.

The individual steps of this procedure are as follows: Housing 3 is moved forwardly along screw 2 in the direction toward barrel 1, setting ring 10 is applied against the rear side of housing 3, ring 10 is clamped upon the shaft of screw 2 by means of bolt 11, and housing 3 is retracted. These steps are repeated until screw 2 has been withdrawn entirely from the barrel.

For withdrawing the plasticizing screw 2 from barrel 1 of the machine according to the embodiment of the invention as shown in FIGURES 5 and 6, bolt 38 is at first unscrewed, the two-piece ring 19 is then withdrawn from screw 2 in a radial direction through the opening 31 in housing 14, and the bearing cover 21 is loosened from housing 14. Pipes 25 and 26 are then disconnected from control box 28 which is then retracted for a certain distance in the axial direction from the machine so as to permit the annular cylinder 6 with the annular piston 12 therein which is mounted, for example, on three piston rods 32 which are displaced at an angle of 120° to each other, to be secured to housing 14 by means of bolts 34. Cylinder 6 is centered relative to housing 14 by an annular centering flange 35. If oil is then passed under pressure through opening 36 into cylinder 6, the force will be transmitted from piston 12 through the three piston rods 32 to the intermediate member 33 which is connected to piston rods 32 to the two-piece setting ring 10. Since this ring 10 is clamped to screw 2 by means of bolts 11, it will then withdraw screw 2 out of barrel 1 for a distance which corresponds to the length of the stroke of piston 12. By repeated strokes of piston 12 and resetting of setting ring 10 on screw 2 after each stroke, it is then possible to withdraw screw 2 entirely from the delivery barrel 1.

For inserting screw 2 into barrel 1, the opposite procedure is carried out. At first, setting ring 10 is mounted on screw 2 at the side of the connecting member 33 facing toward the barrel and the member 33 is secured to piston rods 32 by nuts 39, as shown in FIGURE 5. By alternately applying pressure upon the annular piston 12 through the opening 37 and resetting the setting ring 10 on screw 2, connecting member 33 will be drawn by piston rods 32 against setting ring 10 which is clamped upon screw 2 by bolts 22, so that screw 2 will thus be inserted in a step-by-step movement into the delivery barrel 1.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In a screw injection molding machine comprising a barrel having a feed hopper thereon for feeding a casting material into said barrel, a hollow screw within said barrel, means for rotating said screw, means including a cylinder and an annular piston operatively connected to said screw for moving said screw longitudinally within said barrel for plasticizing the material within and extruding it from said barrel; means for acting upon said screw from the hollow inside thereof, said screw comprising a hollow shaft extending coaxially of and through said cylinder and piston and having an end portion disposed rearwardly of said cylinder, said end portion being freely accessible in the axial direction from the rear end thereof, means for inserting said screw in the axial direction into said barrel from the open rear end thereof and for withdrawing it completely from said barrel through said open end, said inserting and withdrawing means comprising at least one pressure-actuated unit parallel to but spaced from the axis of said screw and comprising a cylinder part and a piston part slidable within said cylinder part, means for securing one of said parts of said unit in a longitudinally fixed position relative to said screw, and to said cylinder, means for removably connecting the other part of said unit to said end portion, and means for exerting a pressure upon said unit for moving said two parts relative to each other.

2. A screw injection molding machine comprising a barrel having a feed hopper thereon for feeding a casting material into said barrel, a hollow screw within said barrel, means for rotating said screw, means for moving said screw longitudinally within said barrel for plasticizing the material within and extruding it from said barrel, and means for acting upon said screw from the hollow inside thereof, said screw being freely accessible in the axial direction from the rear end thereof, said means for rotating said screw comprising a gear mounted on said screw, said screw comprising a hollow shaft, said means for moving said screw longitudinally comprising at least a pressure-actuated unit comprising a plurality of cylinder parts and a plurality of piston parts slidable within said cylinder parts and disposed parallel to said hollow shaft and radially spaced therefrom, said unit being secured to said shaft at least during the operation of said screw, and means for exerting a pressure upon said unit for sliding said cylinder parts relative to said piston parts, means for inserting said screw in the axial direction into said barrel from the open rear end thereof and for withdrawing it completely from said barrel through said open end comprising said pressure-actuated unit and means for removably securing said cylinder parts of said unit to said shaft near the rear end thereof and for securing said piston parts of said unit in a longitudinally fixed position relative to said screw.

3. A screw injection molding machine comprising a barrel adapted to receive casting material, a hollow screw within said barrel for performing operations on said material comprising plasticizing said material and extruding it from said barrel, means for rotating said screw, means for moving said screw longitudinally, means within said hollow screw for influencing said operations, said screw comprising a hollow shaft having a rear end portion thereof projecting rearwardly beyond said means for moving said screw longitudinally, said end portion being freely accessible in the axial direction thereof, and control means at said accessible rear end portion operatively connected to said means within said hollow screw for controlling said latter means.

4. A screw injection molding machine according to claim 3, wherein said means within said hollow screw comprises movable means subdividing the interior of said hollow screw into zones, means for heating or cooling said zones, said control means at said accessible rear portions comprising means for controlling said movable means.

5. A screw injection molding machine according to claim 3, wherein said means for moving said screw longitudinally comprises cylinder and piston means spaced radially outwardly of said screw, and disconnectable means operatively connecting said cylinder and piston means with said screw.

6. A screw injection molding machine according to claim 5, wherein said means for controlling said movable means comprises mechanical means.

7. A screw injection molding machine according to claim 3, wherein said means for rotating said screw comprises a gear on said screw, said means for moving said screw longitudinally comprising cylinder and piston means operatively connected to said screw, said cylinder and piston means being disposed eccentric and parallel to the axis of said screw, and housing means common to the cylinder means of said cylinder and piston means and said gear, said housing means being movable, in response to relative movement of said cylinder and piston means, to effect movement of said gear in a longitudinal direction.

8. A screw injection molding machine according to claim 7, wherein said housing means comprises a housing, a supporting member, said housing being guidably supported for movement upon said supporting member.

9. A screw injection molding machine according to claim 7, wherein said cylinder and piston means comprises two cylinders and two stationary piston rods, said piston rods being provided with axial extensions, supporting means for said housing means comprising spaced cross bars, said extensions being supported by said cross bars.

10. A screw injection molding machine according to claim 3, wherein said means for moving said screw longitudinally comprises a cylinder, an annular piston in said cylinder surrounding said screw, and means for applying pressure to said piston within an annular space defined by said cylinder and piston.

References Cited in the file of this patent

UNITED STATES PATENTS

| | | |
|---|---|---|
| 2,127,857 | Bond | Aug. 23, 1938 |
| 2,449,355 | Wiley et al. | Sept. 14, 1948 |
| 2,629,132 | Willcox et al. | Feb. 24, 1953 |
| 2,641,800 | Myers | June 16, 1953 |
| 2,734,226 | Willert | Feb. 14, 1956 |
| 3,001,233 | Ernst | Sept. 26, 1961 |
| 3,015,844 | Rice | Jan. 9, 1962 |